United States Patent
Magri et al.

(10) Patent No.: US 11,569,909 B2
(45) Date of Patent: Jan. 31, 2023

(54) PREDICTION OF DEVICE PROPERTIES

(71) Applicant: Telefonaktiebolaget LM Ericsson (publ), Stockholm (SE)

(72) Inventors: Roberto Magri, Montignoso (IT); Marcello Morchio, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/433,582

(22) PCT Filed: Mar. 6, 2019

(86) PCT No.: PCT/EP2019/055480
§ 371 (c)(1),
(2) Date: Aug. 24, 2021

(87) PCT Pub. No.: WO2020/177862
PCT Pub. Date: Sep. 10, 2020

(65) Prior Publication Data
US 2022/0149937 A1    May 12, 2022

(51) Int. Cl.
*H04B 10/079* (2013.01)
(52) U.S. Cl.
CPC ..... *H04B 10/0793* (2013.01); *H04B 10/0799* (2013.01)
(58) Field of Classification Search
None
See application file for complete search history.

(56) References Cited

U.S. PATENT DOCUMENTS

| 2014/0357312 | A1* | 12/2014 | Davis | G06V 20/20 455/550.1 |
| 2015/0063159 | A1* | 3/2015 | Bonawitz | H04W 24/02 370/254 |

(Continued)

OTHER PUBLICATIONS

Khan, "An Optical Communication's Perspective on Machine Learning and Its Applications" Journal of Lightwave Technology, vol. 37, No. 2, Jan. 15, 2019, pp. 493-516. (Year: 2019).*

(Continued)

*Primary Examiner* — Darren E Wolf
(74) *Attorney, Agent, or Firm* — Sage Patent Group

(57) ABSTRACT

In order to predict properties of a first device, data is obtained relating to properties of second devices having characteristics in common with the first device. The data comprises values of a first parameter at specific values of a second parameter. The data is organized in a first matrix with each row or column representing one value of the second parameter, and each column or row contains for one of the second devices the value of the first parameter at each of the values of the second parameter for which data is available. The first matrix is factorized into a second matrix and a third matrix. The second matrix represents a relationship between the second parameter and hidden features. The third matrix represents a relationship between the second devices and hidden features. The second matrix and/or the third matrix is used to predict at least one value of the first parameter and at least one respective specific value of the second parameter outside a predetermined range.

20 Claims, 14 Drawing Sheets

(56) References Cited

U.S. PATENT DOCUMENTS

| | | | | |
|---|---|---|---|---|
| 2016/0086087 | A1* | 3/2016 | Ghouti | C10G 7/12 |
| | | | | 706/12 |
| 2017/0140278 | A1* | 5/2017 | Gupta | G06N 20/00 |
| 2017/0163337 | A1* | 6/2017 | Djukic | H04B 10/27 |
| 2018/0174046 | A1* | 6/2018 | Xiao | G06V 40/10 |
| 2018/0266680 | A1* | 9/2018 | Arabi | G05B 23/024 |
| 2019/0122081 | A1* | 4/2019 | Shin | G06K 9/6265 |

OTHER PUBLICATIONS

International Search Report and Written Opinion of the International Searching Authority for PCT International Application No. PCT/EP2019/055480 dated Nov. 8, 2019.

Wikipedia, "Matrix factorization (recommender systems)," retrieved from the Internet Oct. 3, 2019, 4 pages.

* cited by examiner

PREDICTION OF DEVICE PROPERTIES

CROSS REFERENCE TO RELATED APPLICATION

This application is a 35 U.S.C. § 371 national stage application of PCT International Application No. PCT/EP2019/055480 filed on Mar. 6, 2019, the disclosure and content of which is incorporated by reference herein in its entirety.

FIELD OF THE INVENTION

This disclosure relates to predicting the properties of a device, in particular based on partial data relating to the properties of the device.

BACKGROUND

In many technical fields, it is desirable to be able to predict the properties of a device, based on partial data relating to the properties of the device. For example, when a device is operating under certain technical conditions, the partial data about the operation can be obtained. However, it is desirable to be able to predict the properties and behaviour of the device under different technical conditions. As one example, the disclosure relates to predicting the properties of a device across a wide range of temperatures, in particular based on partial data relating to the properties of the device across a narrower range of temperatures.

In order to provide a concrete example, this disclosure specifically describes the use of a method in order to predict the properties of optical modules in data communications networks. However, it will be appreciated that the method can be used in order to predict the properties of any suitable technical device.

Optical modules (i.e. optical transceivers) are ubiquitous in high bandwidth data communications networks, for example in mobile access networks, where they are used to interconnect baseband and radio units.

Optical modules that are placed outdoors in remote radio units are exposed to tough environmental conditions, especially an extreme range of temperatures from −40 up to 90 or more degrees Celsius. Under such conditions, the modules may reach the limits of their operating range and may produce warnings, alarms or even traffic loss and hardware failure.

The optical module itself has a small cost (tens to a few hundred dollars), but the cost of sending a service team to replace an optical module in challenging outdoor premises (e.g. antenna towers, etc.) can be thousands of dollars. It is therefore desirable to be able to predict an incoming failure or potential risk in advance, without waiting for the failure to occur. Such a prediction allows the replacement of an optical module that may fail in normal scheduled maintenance activities without adding extra service costs. This also avoids outages in critical traffic periods.

In order to allow such predictions, optical modules are monitored, and warning and alarm thresholds are set for various analogue monitoring parameters of the optical module. One important parameter is the laser bias current. Once the given parameter exceeds the threshold that has been set, a Network Management System raises the related warning or alarm, which trigger the urgent service operation. However, the warning thresholds may provide an alert with some margin before the failure would cause traffic loss, but a service operation (with the associated costs) would be activated, since it would be a bad practice to leave a 'warned' or 'alarmed' module in operation.

SUMMARY

There is disclosed herein a Machine-Learning based predictive technique, allowing the possibility to predict operating parameter values under conditions that have not yet occurred, and thereby allowing the possibility to take appropriate action before those conditions occur. In the illustrated embodiment, the predictive technique allows the possibility to identify optical modules with a high risk to under-perform or fail under challenging (but possible) environmental conditions (e.g. high temperatures), and thereby allowing a proactive approach to maintenance, According to an aspect of the present invention, there is provided a method for predicting properties of a first device. The method comprises:

- obtaining data relating to the properties of a plurality of second devices, wherein the second devices have characteristics in common with the first device, wherein the data relating to the properties of one device comprise respective values of a first parameter at specific values of a second parameter;
- organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;
- factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and
- based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

When the possible values of the second parameter lie on a continuum, the specific values of the second parameter may comprise intervals of a range of possible values of the second parameter.

The method may comprise obtaining said value of the first parameter at each of the specific values of the second parameter by forming a statistical summarization of a plurality of values of the first parameter associated with the specific values of the second parameter. Specifically, the method may comprise obtaining said value of the first parameter at each of the specific values of the second parameter as a mean of a plurality of values of the first parameter associated with the specific values of the second parameter, or as a median of a plurality of values of the first parameter associated with the specific values of the second parameter.

Organizing the obtained data in the first matrix may comprise organizing the obtained data relating to the properties of a plurality of second devices, and the partial data relating to the properties of the first device, in the first matrix. In that case, the method may further comprise using a non-linear regression to predict the at least one value of the first parameter at the at least one respective specific value of the second parameter outside said predetermined range.

Using the second matrix and/or the third matrix to predict at least one value of the first parameter at the at least one respective specific value of the second parameter outside said predetermined range may comprise applying a linear regression to the partial data relating to the properties of the first device.

Obtaining the data relating to the properties of a plurality of second devices, and organizing the obtained data in the first matrix, may comprise: obtaining initial data relating to the properties of a first plurality of second devices; and selecting, from said initial data, data relating to the properties of a subset of the first plurality of second devices, wherein said subset of the first plurality of second devices contains second devices for which data relating to the respective values of the first parameter are available for a large part of a range of possible values of the second parameter.

The method may further comprise, as a preliminary step, when the partial data comprises respective values of the first parameter at specific values of the second parameter within a narrow range, using a K-Nearest-Neighbours technique to predict at least one value of the first parameter at at least one respective specific value of the second parameter outside said narrow range.

The method may further comprise: including in said third matrix information relating to at least one explicit feature indicating a category of each of said plurality of second devices. Said information relating to at least one explicit feature indicating a category of each of said plurality of second devices may comprise a part number.

The method may further comprise: as additional data relating to the properties of the first device become available, using the second matrix and/or the third matrix to make a new prediction of at least one value of the first parameter at at least one respective specific value of the second parameter.

In one example, the first device and the second devices comprise optical modules. In that example, the first parameter may be a bias current of the optical module and the second parameter may be a temperature. The method may then further comprise using the predicted value of the first parameter at at least one respective specific value of the second parameter to identify a potential failure risk of the optical module. The method may comprise using the predicted value of the first parameter at at least one respective specific value of the second parameter to identify a potential failure risk of the optical module by comparing said predicted value of the first parameter with a specified operating range.

According to another aspect, there is provided a system for predicting properties of a first device. The system comprises:
  a memory for storing data relating to the properties of a plurality of second devices, wherein the second devices have characteristics in common with the first device, wherein the data relating to the properties of one device comprise respective values of a first parameter at specific values of a second parameter;
  at least one processor, wherein the at least one processor is configured for:
  organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;
  factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and
  based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

The memory may be located with the first device, or the memory may be located remote from the first device.

The at least one processor may be located with the first device, or the at least one processor may be located remote from the first device.

In another alternative, the at least one processor may comprise a first processor located with the first device and a second processor located remote from the first device. In that case, the second processor may be configured for:
  organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available; and
  factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and
  the first processor may be configured for:
  based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

The first device and the second devices may comprise optical modules.

According to another aspect, there is provided a network application, for use in predicting properties of a first device. The network application comprises:
  a memory for storing data relating to the properties of a plurality of second devices, wherein the second devices have characteristics in common with the first device, wherein the data relating to the properties of one device comprise respective values of a first parameter at specific values of a second parameter;
  at least one processor, wherein the at least one processor is configured for:
  organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;

factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features.

The at least one processor may be further configured for:

based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

The network application may be configured for sending a model based on the factorization of the first matrix to at least one remote device.

According to another aspect, there is provided a host equipment for predicting properties of a first device. The host equipment comprises:

an input for receiving data relating to the properties of a plurality of second devices, wherein the second devices have characteristics in common with the first device, wherein the data relating to the properties of one device comprise respective values of a first parameter at specific values of a second parameter;

at least one processor, wherein the at least one processor is configured for:

based on partial data relating to the properties of the first device, wherein the partial data comprises respective values of the first parameter at specific values of the second parameter within a predetermined range, using a model to predict at least one value of the first parameter at at least one respective specific value of the second parameter outside said predetermined range.

The host equipment may be configured for transmitting said received data to a central application, and for receiving said model from said central application.

The host equipment may further comprise:

a memory for storing said data relating to the properties of a plurality of second devices, wherein the second devices have characteristics in common with the first device, wherein the data relating to the properties of one device comprise respective values of a first parameter at specific values of a second parameter;

wherein the at least one processor is further configured for:

organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available; and factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features, to form said model.

This has the advantage that, when partial data are available, comprising respective values of a first parameter at specific values of a second parameter within a predetermined range, it is possible to predict at least one value of the first parameter at at least one respective specific value of the second parameter outside the predetermined range.

The method is flexible and reliable, since it extracts the prediction information from the partial data relating to the first device and the data relating to the second devices, rather than relying on complex a-priori modelling.

In addition, the prediction requires relatively little computing power, and so it can be performed close to the relevant devices, if desired.

In the specific illustrated case of optical modules, for example in Radio Access Networks, it is possible to identify optical modules with a high risk of underperforming or failing under challenging (but possible) environmental conditions, such as extreme temperatures. This allows a network operator to perform pro-active maintenance, with savings in operating expenditure and increased network reliability. In addition, where the network includes optical modules from multiple suppliers, it allows the network operator to rank the suppliers based on the quality of their products.

DETAILED DESCRIPTION

The method described herein can be used in many technical fields, in order to predict the properties of a device, based on partial data relating to the properties of the device. For example, when a device is operating under certain technical conditions, the partial data about the operation can be obtained. However, it is desirable to be able to predict the properties and behaviour of the device under different technical conditions.

In order to provide a concrete example, this disclosure specifically describes the use of a method in order to predict the properties of optical modules in data communications networks. However, it will be appreciated that the method can be used in order to predict the properties of any suitable technical device.

Optical modules (i.e. optical transceivers) are very widely used in high bandwidth data communications networks, for example in mobile access networks, where they are used at each end of every fibre-based connection between a Remote Radio Unit (RRU) and a Baseband Unit (BBU). Many such devices are installed on outdoor radio units, and are exposed to challenging environmental conditions (temperature, humidity, etc).

These modules are pluggable and can be replaced when faulty. Typically, a module itself can costs a few tens or hundreds of dollars, but the outdoor replacement activity is very expensive and should be optimized as much as possible. For this reason, it is advantageous to be able to predict the risk of a fault before it occurs, so that a module in danger of failing can be replaced during an ordinary site visit without the extra cost of an emergency replacement service activity.

Figure 1:
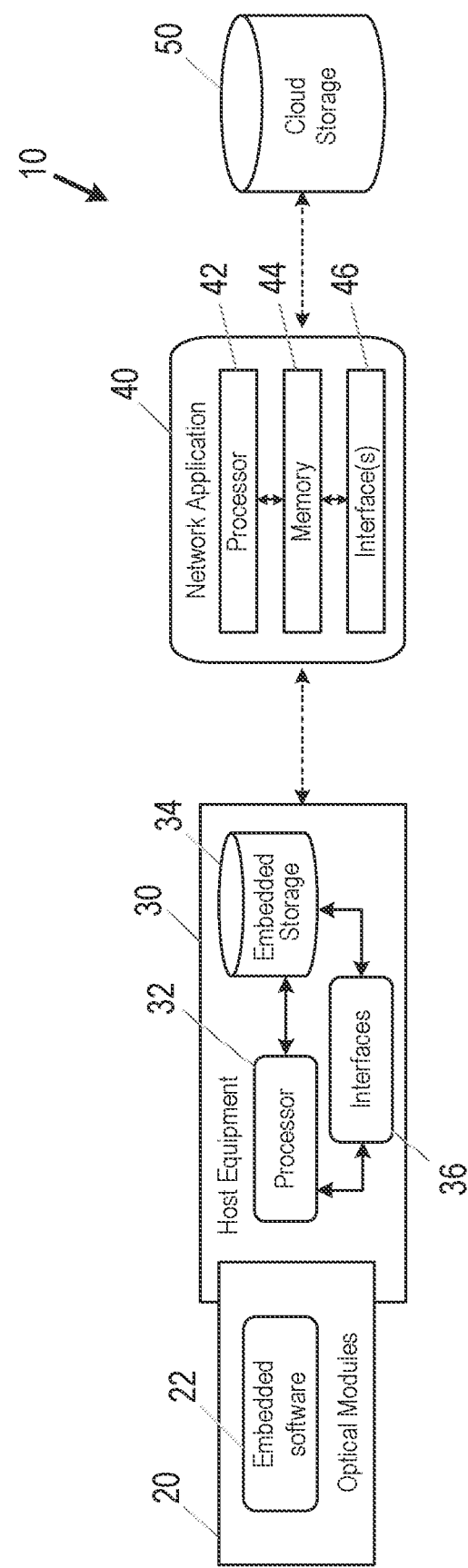
FIG. 1 shows a part of a data communication network in accordance with an aspect of the disclosure.

FIG. 1 illustrates a part of one possible network, in this case a radio access network of a mobile communications network, in which optical modules are used.

Specifically, FIG. 1 shows a part of a network 10, comprising multiple optical modules, of which only one set of optical modules 20 is shown in FIG. 1. The optical modules 20 form part of a host equipment 30, for example a Remote Radio Unit (RRU) or a Baseband Unit (BBU) of a base station. Typically, a mobile network comprises multiple nodes made up of radio units and baseband units, where only one baseband unit is connected to the backhaul interface.

The optical modules 20 run under the control of suitable embedded software 22.

As is conventional, the optical modules 20 have an electrical interface that receives electrical power, and an optical interface that transmits and receives laser light signals along a fibre optic cable that is used to transmit data between the nodes of the network.

The host equipment 30 comprises a processor 32 running suitable embedded software, and also comprises embedded storage 34 and various interfaces 36, as required, amongst other components.

The host equipment 30 is one of potentially many host equipment devices that are connected to a network application 40, for example a network management application, a service analytics application, or the like, which may be cloud-based. The network application 40 includes a processor 42, for running suitable software; a memory 44, for storing operational data and programs; and at least one interface 46 for connecting to other network nodes. The network application may be cloud-based, and it may have virtually unlimited computing power, as it is scalable on cloud clusters of multiple cores and machines, with terabytes of memory.

The network application is connected to a memory 50, for example a cloud storage device, which is configured to store data, as described in more detail below.

Figure 2:
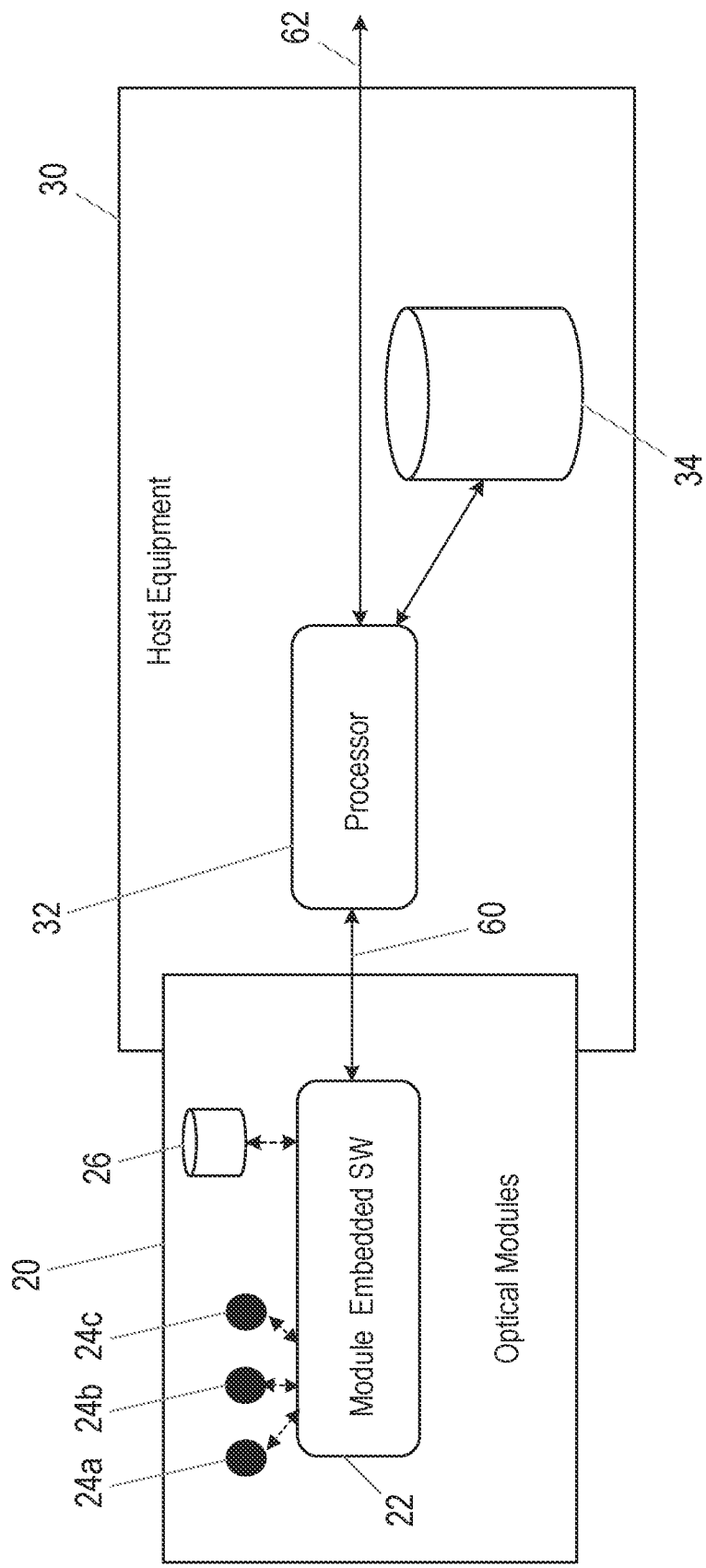
FIG. 2 shows in more detail a part of the data communication network of FIG. 1.

FIG. 2 illustrates in more detail a part of the network 10.

Specifically, FIG. 2 shows a set of optical modules 20 as shown in FIG. 1, with embedded software. The optical modules 20 also include multiple embedded sensors 24a, 24b, 24c, which provide sensor data to the embedded software 22 of the module. The module also includes a memory 26, for example for storing the sensor data.

An optical module may be equipped with a local processor for running the embedded software 22 with very small computing power and minimal memory equipment (for example a single microprocessor in the range of some tens of MHz of core speed, with tens of kilobytes of embedded RAM). It allows the collection of sensor data (such as the laser bias current, the device temperature, the transmit and receive power etc.), alarms and warning notifications, and static information which is stored in the module memory such as the module vendor, model part number and serial number, production date code etc. Some or all of this information can be used in a prediction algorithm as described in more detail below.

The optical modules 20 are connected to the host equipment 30 by means of a Digital Diagnostic Monitoring Interface (DDMI) 60. The host equipment can host tens of optical modules 20.

Data is collected by the host equipment 30 via the DDMI. The role of the embedded software running on the host equipment is to perform real time operations, for example in the case of the management of optical modules this may involve activating actions consequent upon specific sensor readings or an explicit alarm condition. Moreover the embedded software running on the host equipment processor 32 exposes the host control interface to the cloud-based network application 40, in order to grant access to the data relevant to the host equipment itself, including data relating to the optical modules.

The host equipment embedded processor 32 has reasonable computing power, but it is usually limited by a relatively small embedded storage 34 (for example it may be a single core microprocessors in the range of hundreds of MHz-1 Ghz of core speed, with a few gigabytes of RAM).

The host equipment 30 is connected to the network application 40 by means of a host control interface 62.

Figure 3:
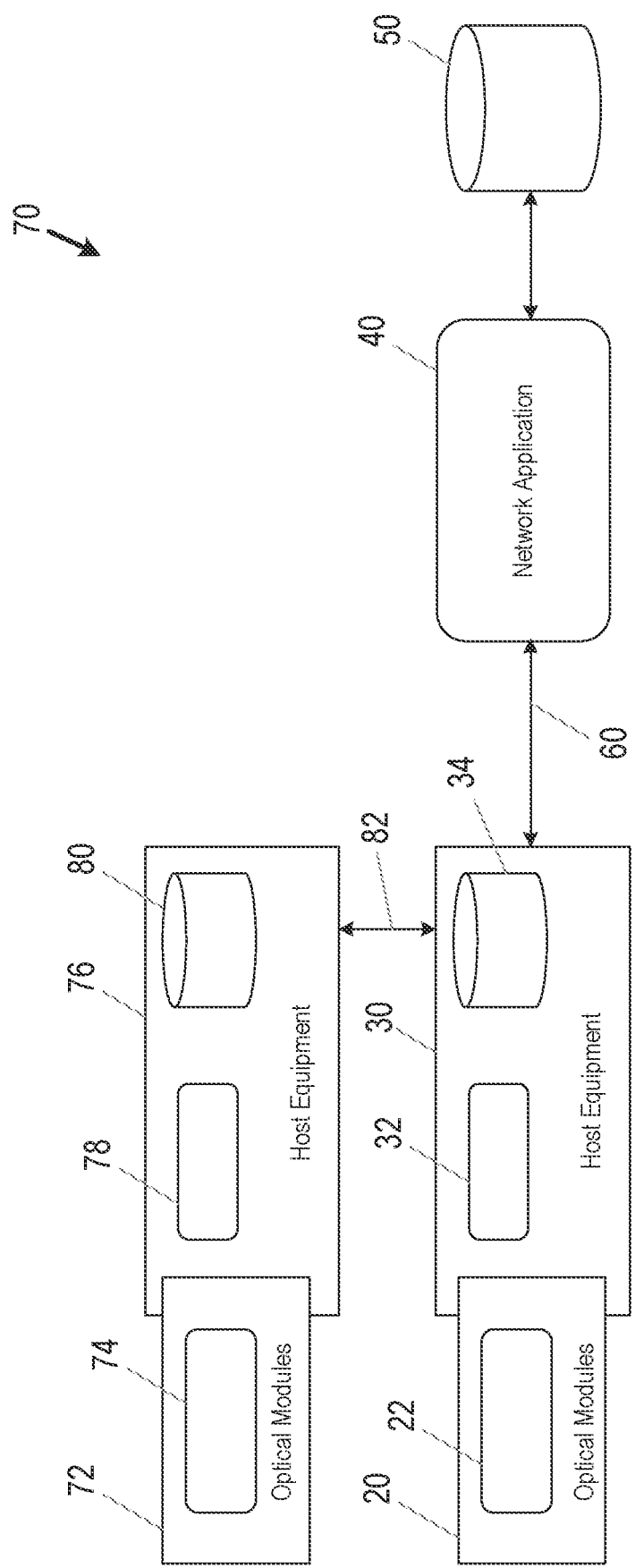
FIG. 3 shows a part of a second data communication network in accordance with an aspect of the disclosure.

FIG. 3 illustrates a part of another possible network in which optical modules are used, and specifically FIG. 3 shows an example where there is a hierarchy of hosts connected together forming a node, with a single host equipment connected to the Cloud.

More specifically, FIG. 3 shows a part of a network 70, comprising multiple optical modules, of which (as in FIG. 1) one set of optical modules 20 form part of a host equipment 30, for example a Remote Radio Unit (RRU) or a Baseband Unit (BBU) of a base station. The optical modules 20 run under the control of suitable embedded software 22.

As is conventional, the optical modules 20 have an electrical interface that receives electrical power, and an optical interface that transmits and receives laser light signals along a fibre optic cable that is used to transmit data between the nodes of the network.

The host equipment 30 comprises a processor 32 running suitable embedded software, and also comprises embedded storage 34 and various interfaces 36, as required, amongst other components.

The host equipment 30 is one of potentially many host equipment devices that are connected to a network application 40, for example a network management application, a service analytics application, or the like, which may be cloud-based. The network application 40 includes a processor, for running suitable software; a memory, for storing operational data and programs; and at least one interface for connecting to other network nodes.

The network application 40 is connected to a memory 50, for example a cloud storage device, which is configured to store data, as described in more detail below.

In addition, a second set of optical modules 72 form part of a second host equipment 76, for example a Remote Radio Unit (RRU) or a Baseband Unit (BBU) of a base station. The optical modules 72 run under the control of suitable embedded software 74.

As is conventional, the optical modules 72 have an electrical interface that receives electrical power, and an optical interface that connects to a fibre optic cable that is used to transmit data between the nodes of the network.

The second host equipment 76 comprises a processor 78 running suitable embedded software, and also comprises embedded storage 80 and various interfaces, as required, amongst other components.

The second host equipment 76 is connected to the first host equipment 30 by means of a suitable interface 82, allowing sensor data from sensors provided on the optical modules 74 to be reported to the network application 40 by means of the DDMI interface 60.

The sensors provided on the optical modules 20, 72 generate considerable amounts of data. From the available sensor information, the module operating temperature and the laser bias current are the most relevant to identify the risk of malfunctioning.

The relationship between the bias current and the temperature is typically exponential, since the power is typically held constant by control loops in the optical modules. For example, in one model, the relationship between the power P of the laser and the current I can be expressed as:

$$P = \text{eff}(I - I_{th}),$$

where an efficiency value, eff, and a threshold current, $I_{th}$, are both exponentially related to the temperature. In general, it is observed that the bias current increases strongly with temperature.

Thus, an increase in the operating temperature of the optical module requires an exponential increase in the bias current to maintain the desirable output power. Above a certain current level, the driving circuit stops working safely and undesirable behaviour can be expected. For example, the laser may be shot down, resulting in a loss of traffic. As another example, the bias current may be is clamped, leading to a decrease in optical output power, and a risk of service disruption. As another example, the bias current may increase to dangerous levels, with a risk of hardware failure.

Warning and alarm thresholds are set on the radio equipment to alert when this critical condition is approached. When a warning or alarm is raised, an expensive emergency field intervention is necessary.

Optical modules are typically specified to operate at temperatures up to 85 degrees. However, adverse operating conditions may arise. For example, the temperature of the optical module may reach a value higher than the specified maximum operating temperature value (or a value lower than the specified minimum operating temperature), which is certainly possible in hot locations or because of an air-conditioning failure. As another example, the module temperature may remain within specified operating conditions, but the module is of poor quality (for example because of a manufacturing issue, ageing, etc.) and its required bias current fails to comply with the specified operation.

If a network operator is able to know in advance the behaviour of the modules at high temperatures, 'risky' modules (in relation to the environment where they are installed) can be identified, and a safe replacement can be planned under normal maintenance or site visits without adding extra costs.

Thus, in particular, it would be desirable to predict the modules' bias current at high temperatures, based on the actual partial measurement data provided at lower temperatures.

One option for making such predictions could be extrapolating the partial measurement data with an exponential fitting, for example performing a non-linear regression. Based on data relating to the bias current of an optical module as a function of temperature, for temperatures in a certain range, it is possible to perform a non-linear regression, in order to obtain an estimated form of the exponential relationship between the bias current and the operating temperature of the optical module. Typically, this technique produces good results when interpolating between the partial data points. However, when the available partial data relate to a relatively narrow temperature range, and it is desired to predict the bias current at one or more temperature significantly outside that range, the extrapolation error can increase significantly.

The method described herein exploits the availability of the data collected from many (for example hundreds or thousands) of modules from a real network, and extracts a model for a specific device of interest from that data, and from the partial data relating to that specific device. The data that is collected can be obtained from radio units placed in many different locations, but the data obtained can be quite sparse in nature, since some modules may experience one range of temperatures, while other modules experience a different range of temperatures, some may experience temperatures across the full operating range, while others may experience temperatures across a very limited range of temperatures.

More specifically, the method described herein uses a Machine Learning technique, Collaborative Filtering, which is used in the completely different field of recommender systems, for user profiling, generating personalized advertisements, and predicting the products that a user may be interested in by exploiting that user's feedback on some items and the feedback on those and other items by other people. The technique can extract significant hidden features describing items and users without any prior knowledge.

In particular, the method described proceeds from the recognition that, in some situations, partial data may be available relating to the properties of a technical device, wherein the partial data comprises respective values of a first parameter at specific values of a second parameter, and data may also be available relating to the properties of similar technical devices, wherein that data comprises respective values of the first parameter at different specific values of the second parameter. In a similar way to the collaborative filtering described above, the technique can be used to predict at least one value of the first parameter at at least one other specific value of the second parameter. For example, the partial data may comprise respective values of the first parameter at specific values of the second parameter within a predetermined range, and the collaborative filtering may be used to predict at least one value of the first parameter at at least one value of the second parameter outside the predetermined range.

Thus, in the specific example described herein relating to optical modules, the available current-temperature data may be sparse in a way that is similar to feedback data provided by the user of a recommender system. In a way that is similar to how collaborative filtering is able to predict the interests of a user from his rating on some items and the ratings of many other users to those and other items, it can also predict the behaviour of a module in some environmental conditions (e.g. high temperatures) from its behaviour in other (safer) conditions and the behaviours of many other modules which have experienced a wider range of conditions.

Figure 4:
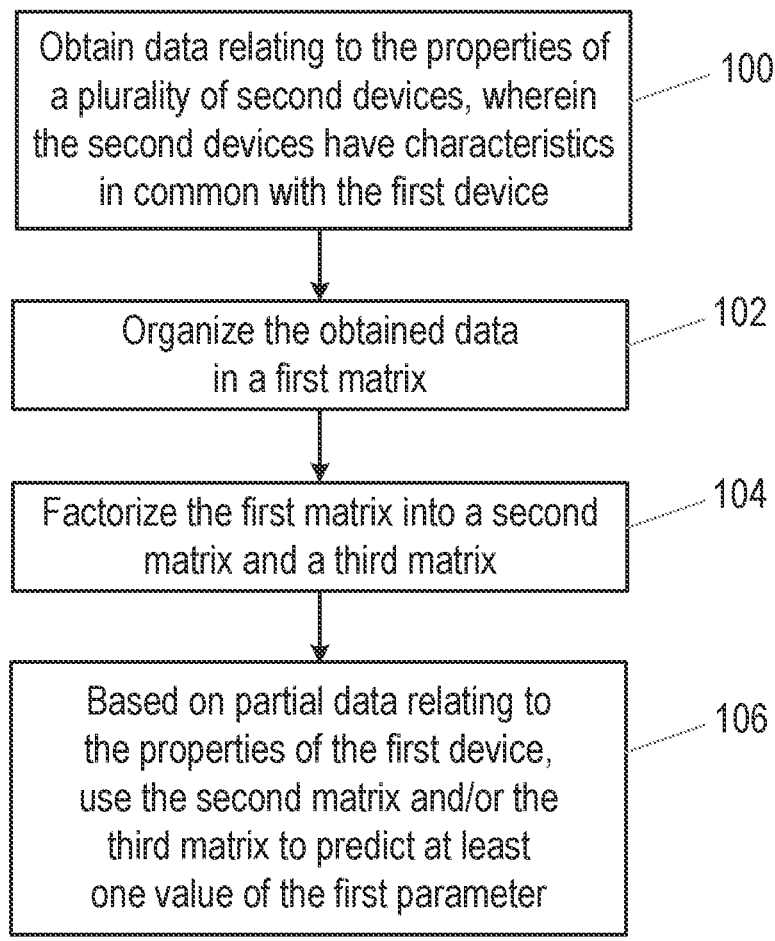
FIG. 4 is a flow chart, illustrating a method in accordance with an aspect of the disclosure.

FIG. 4 is a flow chart illustrating a method in accordance with an aspect of the disclosure.

Specifically, FIG. 4 illustrates a method for predicting properties of a first device.

The method starts at step 100 with obtaining data relating to the properties of a plurality of second devices. The second devices have characteristics in common with the first device, and more specifically may be the same genera type of device. For example, in the case where the first device is an optical module, the second devices may all be optical modules. In some embodiments, the second devices may be supplied by different manufacturers and/or may be supplied by the same manufacturer under different part numbers. In other embodiments, the second devices may all be nominally identical with the first device.

The data relating to the properties of a device comprise respective values of a first parameter at specific values of a second parameter.

In the example of an optical module, the data comprise respective values of a bias current at specific values of the temperature. The data are measured by sensors provided on the optical modules, and then for example may be stored in EEPROM in the form specified by the document "Diagnostic Monitoring Interface for Optical Transceivers", SFF-8472 Rev 11.0, published by the Small Form Factor (SFF) Committee, and exported outside the module via an I2C interface. When modules are deployed in the field, the measured data can be read via a Network Management System (for example the Network Application 40 shown in FIG. 1) and collected in a database (for example the database 50 shown in FIG. 1). This training set data can be acquired from a real live network but can also be acquired from laboratory measurements, the amount of data should be statistically significant to cover all possible modules and situations.

The values of bias current and temperature are sampled over time according to a desired scheduled program, and saved in the database. For example, measurements may be made on a module once per day, or once every few hours or even once every few minutes.

The data relating to the second devices form a training set used in this machine learning approach, and thus consists of couples of temperature and bias currents taken at different times on a wide set of optical modules.

The training set needs to be large enough to include a significant presence of all possible types of optical module. A dataset of a few hundreds to several thousand modules is typically enough. When new module types are introduced into the market, the training set can be updated.

Figure 5:
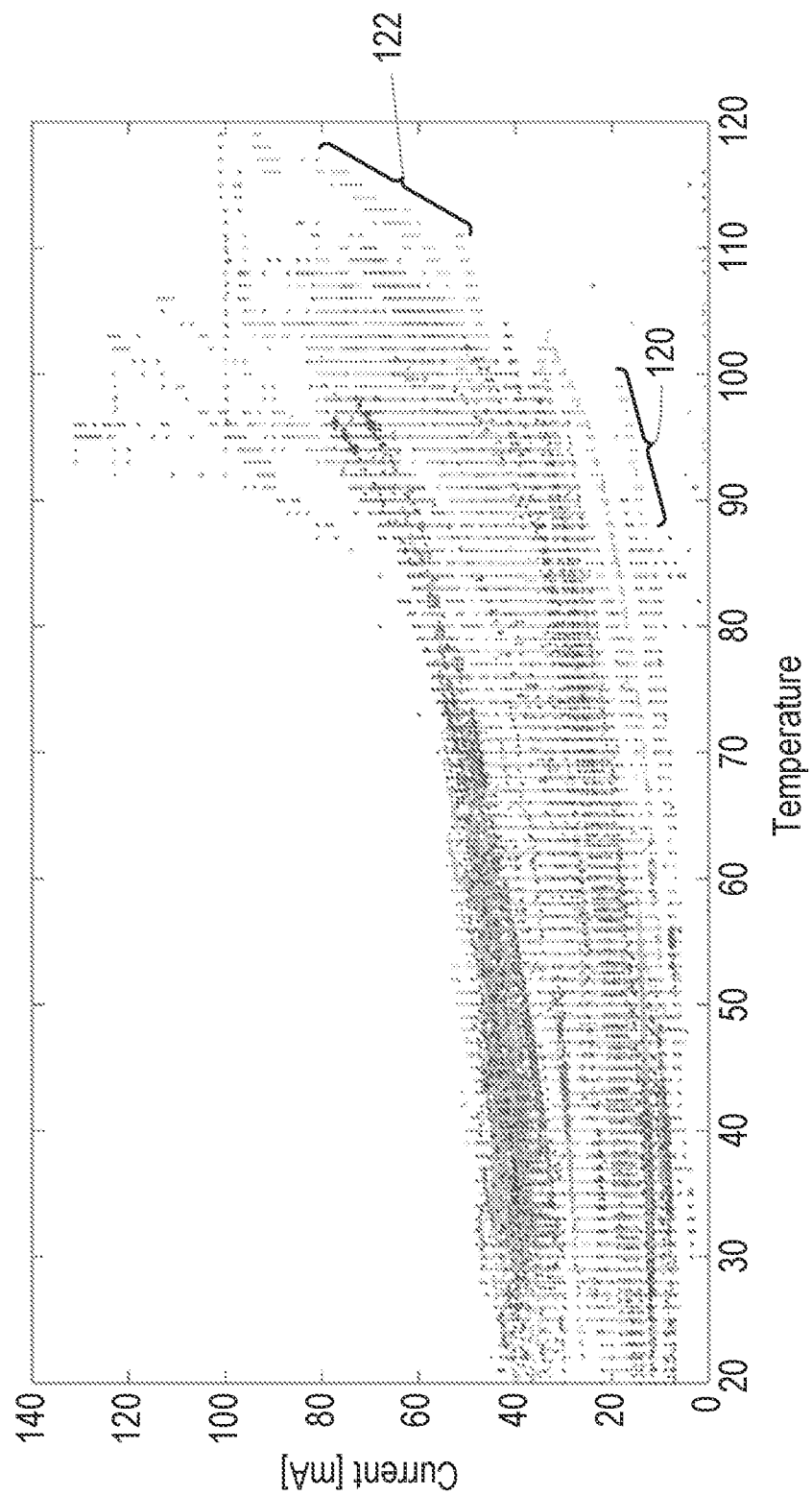
FIG. 5 illustrates data relating to the properties of a plurality of devices.

FIG. 5 illustrates the raw data acquired from about 500 modules, i.e. the values of the bias current at specific temperature values. For example, the data points 120 are obtained from one second device, while the data points 122 are obtained from another second device. In the case of the data points 122, it can be seen that some of these are in fact "bars", indicating that several measurements were made at the same temperature, with slightly different bias current values.

The data acquired from the sensors on the modules are many couples of current and temperature (I,T) taken at different times, depending on the sampling rate of the collection process. Therefore, each module may provide a different number of samples. The acquired data needs to be re-arranged into a form in which they can be used by the Machine Learning method. One possibility is to use a binning technique. The possible values of the second parameter, i.e. the temperature, lie on a continuum (that is, the temperature can in principle be specified with any desired measurement accuracy).

The binning consists of dividing the temperature range that is to be covered into discrete intervals. For example, in the case of optical modules, a temperature range from 0 degrees Celsius to 120 degrees Celsius may be divided into intervals of 1 degree.

Then, each of the discrete intervals of the second parameter (i.e. the temperature) is associated to a maximum of one value of the first parameter (i.e. the bias current), based on the raw data. That is, if the raw data comprises a plurality of values of the first parameter associated with a particular specific value of the second parameter, one value of the first parameter to be used in the further processing is obtained by forming a statistical summarization of the plurality of values in the raw data. For example, if there are multiple bias current values measured at temperatures in the range from 24.5° C.-25.5° C., the value of the bias current that is to be associated with the temperature 25° C. in the further processing is obtained by forming a statistical summarization of those multiple bias current values.

For example, the value of the first parameter at each of the specific values of the second parameter may be taken to be the mean of a plurality of values of the first parameter associated with that specific value of the second parameter in the raw data. As another example, the value of the first parameter at each of the specific values of the second parameter may be taken to be the median of a plurality of values of the first parameter associated with that specific value of the second parameter in the raw data.

Returning to FIG. 4, the method continues in step 102, in which the obtained data are organized in a first matrix. As described in more detail below, each row of the first matrix represents one specific value of the second parameter, and each column of the first matrix contains, for a respective one of the second devices, the value of the first parameter at each of the specific values of the second parameter for which data is available. It will be appreciated that the rows and columns of the first matrix can be interchanged without altering the effect. The first matrix then acts as training data for the machine learning technique.

Thus, the first matrix is an N×M matrix Z where N is the number of temperature intervals and M is the number of optical modules.

$$\overbrace{\begin{bmatrix} I11 & I12 & \ldots & I1M \\ I21 & I22 & \ldots & I2M \\ \ldots & & & \ldots \\ \ldots & & & \ldots \\ IN1 & IN2 & \ldots & INM \end{bmatrix}}^{M\ modules} \left.\vphantom{\begin{bmatrix} I11 \\ I21 \\ \ldots \\ \ldots \\ IN1 \end{bmatrix}}\right\} N\ \text{Temperatures}$$
$$Z$$

Thus, the first column of the first matrix contains the bias current values I11, I21, . . . , IN1, for each of the N temperature intervals for a first optical module. The second column contains the bias current values I12, I22, . . . , IN2, for each of the N temperature intervals for a second optical module, and so on until the Mth column contains the bias current values I1M, I2M, . . . , INM, for each of the N temperature intervals for an Mth optical module.

A zero is inserted where no bias current measurement is available for a given module in a given temperature interval. This means that Z is typically a sparse matrix.

As mentioned above, the method described herein uses a technique similar to the collaborative filtering used in e-commerce recommender systems. In one embodiment, this takes advantage of the fact that Z is a sparse matrix, by using low-rank matrix-factorization of the sparse matrix.

Thus, in FIG. 4, step 104 comprises factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features.

More specifically, the process of factorizing the first matrix comprises finding a second matrix U and a third matrix V, such that:

$$\underbrace{\begin{bmatrix} X11 & \ldots & X1k \\ X21 & \ldots & X2k \\ \ldots & & \ldots \\ \ldots & & \ldots \\ XN1 & \ldots & XNk \end{bmatrix}}_{U}^{k\ features} * \underbrace{\begin{bmatrix} O11 & \ldots & O1M \\ O21 & \ldots & O2M \\ \ldots & & \ldots \\ Ok1 & \ldots & OkM \end{bmatrix}}_{V} \approx$$

$$\underbrace{\begin{bmatrix} I11 & I12 & \ldots & I1M \\ I21 & I22 & \ldots & I2M \\ \ldots & & & \ldots \\ \ldots & & & \ldots \\ IN1 & IN2 & \ldots & INM \end{bmatrix}}_{Z}^{M\ modules} N\ \text{Temperatures}$$

The matrix factorization model is shown in the figure above. The technique consists of factorizing the (N×M) Z matrix, built in the step before, into the product of two low-rank matrixes. One of these represents the hidden features associated to the temperatures, while the other represents the hidden features associated to specific optical modules or, alternatively, the regression coefficients with which each module weights the temperature features.

The result is a feature matrix with low dimensionality since essential hidden features will be extracted leading to a concise model that can be used to make predictions on other modules.

The number of features k must be chosen, typically in advance. Rank analysis can be performed on the raw data in order to determine the number of independent features that exist, and hence the optimal number of features to be used. Typically, the number of independent features is less than 5. In one example, using 2 or 3 features gives satisfactory results. More features are not necessary and may result in data overfitting. Regularization can be applied if a higher number of features is applied.

The matrix factorization model shown above illustrates an (N×k) second matrix U, where the first column contains the values X11, X21, . . . , XN1, of a first hidden feature for each of the N temperature intervals. The kth column contains the values X1k, X2k, . . . , XNk, of the kth hidden feature for each of the N temperature intervals. The third (k×M) matrix V contains one row for each of the features, and one column for each of the modules.

The training process consists of performing the factorization to obtain the low-rank matrices U and V whose product best reconstructs the target matrix Z. Standard techniques can be applied to perform the factorization. For example, U and V can be randomly initialized and then gradient descent optimization applied to minimize the mean square error.

Figure 6:
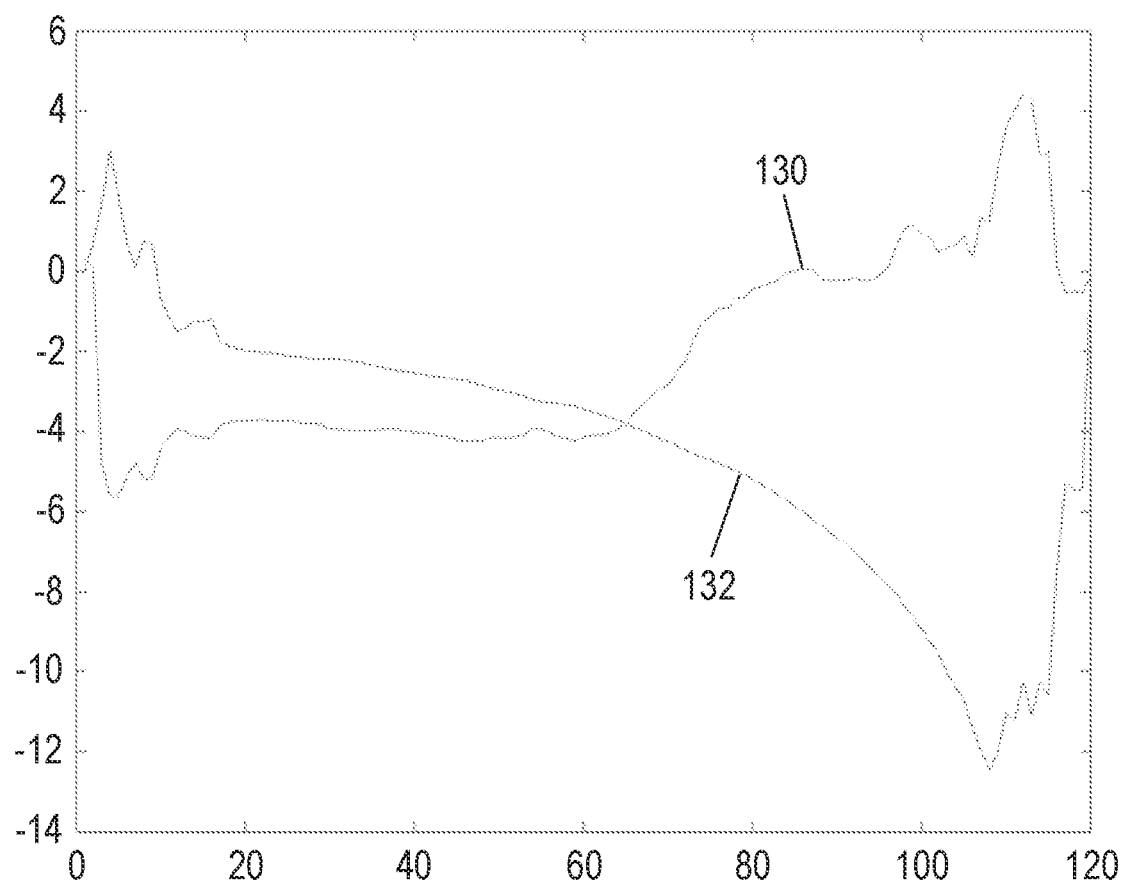
FIG. 6 illustrates a stage in the method of FIG. 4.

FIG. 6 illustrates the result of performing the factorization, and in particular represents the contents of the second matrix U, which is the feature matrix that represents a simplified model for the temperature behaviour of the modules.

Specifically, in an example where there are two hidden features (i.e. k=2), the lines 130, 132 in FIG. 6 shows the variation of the two hidden features across the N temperature intervals.

It can be seen that the typical exponential characteristic of the laser behaviour has been captured, together with other characteristic shape found in the training dataset.

In some examples, optical modules are not able to provide data across the entire possible temperature range, or at least do not provide data at all temperatures, and hence the first matrix Z matrix is a sparse matrix. That is, the matrix contains a large number of zero elements.

However, the second and third matrices U and V will typically be full matrixes.

In other examples, a selection of modules that each provide full temperature range coverage can be used as the training set, and in that case the Z matrix is not sparse. Thus, in the method of FIG. 4, the steps 100 and 102 of obtaining the data relating to the properties of a plurality of second devices, and organizing the obtained data in the first matrix, may comprise: obtaining initial data relating to the properties of a first plurality of second devices; and selecting, from said initial data, data relating to the properties of a subset of the first plurality of second devices, wherein said subset of the first plurality of second devices contains second devices for which data relating to the respective values of the first parameter are available for a large part of a range of possible values of the second parameter.

Singular Vector Decomposition (SVD) can be used to perform the factorization and obtain the low-rank matrices U and V if the Z matrix is not sparse.

Having performed the matrix factorization, the process of FIG. 4 proceeds to step 106 in which, based on partial data relating to the properties of the first device, wherein the partial data comprises respective values of the first parameter at specific values of the second parameter within a predetermined range, the second matrix is used to predict at least one value of the first parameter at at least one respective specific value of the second parameter outside said predetermined range.

The obtained prediction can be used for various purposes. As one example, if it is predicted that the laser will cross a warning or alarm threshold, pro-active maintenance can be scheduled and performed. As another example, the predictions relating to multiple modules can be used to classify them into good and bad modules. This classification can then be used to identify which vendors provide the highest quality parts, and can be used to assess compliance with a specification. As another example, the obtained prediction can be used to identify the root causes of faults that occur.

The result of the factorization process can be used in one of two general ways to make predictions for the first device, whose properties are desired to be predicted. These general ways are known in the literature relating to collaborative filtering as 'model based' and 'memory based'.

1) Model Based Methods.

The matrix U is the features model. If we want to predict the bias current of a new in-field module at high temperatures, when we have only partial data indicating the bias current at low temperatures, we simply perform a linear regression of the available bias current data using the feature matrix predictors U at the temperatures for which we have data.

That is:

$v$=regression($z, U2$), where z is the 'binned' vector containing the available currents and temperatures of the new module, and U2 is derived from U by removing all the temperature rows where the vector z relating to the new module does not have entries.

In this way, we obtain the regression coefficient vector v and evaluate the bias current of the new module at all temperatures, expressed as the vector z2, by using the transpose v' of the vector v, i.e. simply:

$$z2=U2*v'.$$

Thus, the method step 106 of using the second matrix to predict at least one value of the first parameter at the at least one respective specific value of the second parameter outside said predetermined range comprises applying a linear regression to the partial data relating to the properties of the first device.

The result of this process is that the model, once trained, is fixed. Therefore, in some embodiments, the model is updated when we know that a new models or typology of optical modules is introduced.

2) Memory Based Methods.

In memory-based methods, the factorization process described above is performed by including in the training set of matrix Z one or more columns corresponding to the new optical module or modules whose properties are to be predicted. This is more memory and time-consuming than the model-based methods, but allows the training set to be updated regularly, as the new modules are automatically added to the training set for future use.

The data relating to the module that are to be used for the prediction may be the whole historical records or may be a time windowed selection, in order to capture only the recent behaviour of the module whose properties are to be predicted, and thereby allow effects due to ageing to be identified.

Thus, the method step 102 of organizing the obtained data in the first matrix comprises organizing the obtained data relating to the properties of a plurality of second devices, and the partial data relating to the properties of the first device, in the first matrix.

The result of the factorization performed in step 104 is to compute the second matrix and the third matrix, and these are both complete. Thus, in step 106, the complete data for the module whose properties are to be predicted can be obtained from the second matrix and the third matrix In a situation in which too few data are available about the device or module whose properties are to be predicted, the matrix factorization approach described above may overfit the data leading to poor prediction.

In this situation, an alternative collaborative filtering technique called K-Nearest-Neighbors (KNN) may be used instead.

The partial incomplete data array of the module whose properties are to be predicted is compared to all the columns of the Z matrix and the k columns of Z with the lowest Euclidean distance to the module array are selected.

The prediction is then made by averaging those k columns at all the temperature values. A number k in the range 1 to 5 is enough for a good prediction. Since the prediction is no more the output of a regression, overfitting is avoided. This approach is memory-based since the whole training set Z is used for each prediction.

One possibility is to use KNN initially, for example when only a very small range of temperatures is covered by the data of the module to be predicted (for example less than 10 degrees range), and switch to the factorization matrix when a wider range of data is available.

Thus, the method of FIG. 4 may further comprise, as a preliminary step, when the partial data comprises respective values of the first parameter at specific values of the second parameter within a narrow range, using a K-Nearest-Neighbours technique to predict at least one value of the first parameter at at least one respective specific value of the second parameter outside said narrow range.

As mentioned above, the set of devices, whose data is used in the first matrix, may be restricted to devices that are nominally identical to the device whose properties are desired to be predicted. Where different models (i.e. different part numbers) of device exist, separate machine-learning models may be trained for each part number.

In other embodiments, data relating to devices that are not nominally identical to the device whose properties are desired to be predicted may be used in the first matrix. In the case of optical modules, for example, modules sold by a manufacturer under different part numbers, and even modules sold by different manufacturers may have components in common, and this means that useful information can be extracted from the devices that are not nominally identical to the device whose properties are desired to be predicted. In these embodiments, the reliability of the predictions, and the cold start performance, can be improved by explicitly using categorical information relating to the optical modules. Information such as the supplier, part number, and production lot are all available in the DDMI data and can be exploited to refine the model.

Specifically, a set of relevant optical module features (for example the part number and production lot) are selected, and coded in the module feature matrix (i.e. the third matrix V in the description above) as Boolean features.

For each optical module in the training set, a set of rows is added, one for each possible value of the feature. Each entry will be 0 or 1 depending on whether the optical module features corresponds to that value. That is, if four different part numbers are possible, four rows are added, and the column relating to a particular optical module contains a 1 in the row corresponding to its part number, and a 0 in the three rows corresponding to other part numbers. This avoids erroneous weighting if categorical features are coded as numbers.

Thus, in this case the process of factorizing the first matrix Z comprises finding a second matrix U and a third matrix V, such that:

$$\underbrace{\begin{bmatrix} X11 & \dots & X1k & D11 & \dots & D1w \\ X21 & \dots & X2k & D21 & \dots & D2w \\ \dots & \dots & \dots & & & \dots \\ \dots & \dots & \dots & & & \dots \\ XN1 & \dots & XNk & DN1 & \dots & DNw \end{bmatrix}}_{U} * \underbrace{\begin{bmatrix} O11 & \dots & O1M \\ O21 & \dots & O2M \\ \dots & & \dots \\ Ok1 & \dots & OkM \\ C11 & \dots & C1M \\ \dots & & \dots \\ Cw1 & \dots & CwM \end{bmatrix}}_{v} \approx$$

$$\underbrace{\begin{bmatrix} I11 & I12 & \dots & I1M \\ I21 & I22 & \dots & I2M \\ \dots & & & \dots \\ \dots & & & \dots \\ IN1 & IN2 & \dots & INM \end{bmatrix}}_{Z} N \text{ Temperatures}$$

The first matrix Z, second matrix U, and third matrix V are all as described previously, except that w new columns are added to the second matrix U, and w new rows are added to the third matrix V, with the number of new columns and rows (i.e. w) being equal to the number of part numbers that can be specified. The row C11, . . . , C1M corresponds to one particular part number. A 1 is entered in the relevant column of that row for each of the modules that have that part number, and a 0 is entered in the relevant column of that row for each other module. Similarly, the row C21, . . . , C2M corresponds to a second part number. A 1 is entered in the relevant column of that row for each of the modules that have that part number, and a 0 is entered in the relevant column of that row for each other module. The relevant entries are known from the DDMI, and are not object of the optimization in the training phase of the collaborative filtering.

In this way we combine some domain knowledge of the optical module characteristic with the machine learning approach.

Thus, the method of FIG. 4 may further comprise including in said third matrix information relating to at least one explicit feature indicating a category of each of said plurality of second devices.

Some further Figures are now presented to show the performance of the Machine Learning approach described above.

Figure 7:
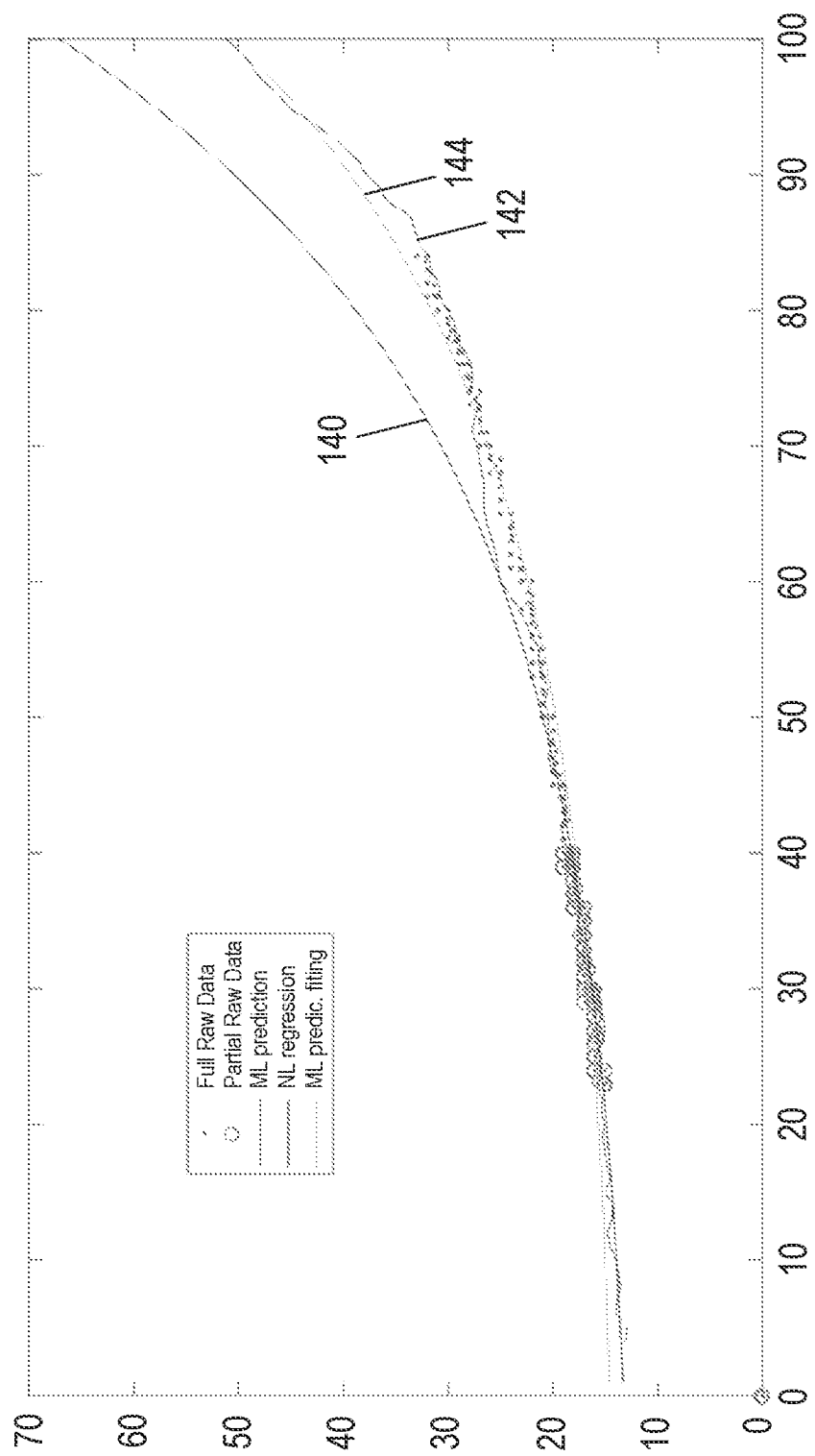
FIG. 7 illustrates operation of the method of FIG. 4.

FIG. 7 shows a situation where bias current data is available for an optical module across a temperature range from about 22° up to about 85°. The data from a restricted temperature range from about 22° up to about 40° is then used for testing the machine-learning method.

The line 140 in FIG. 7 is the prediction of the bias current, at temperatures across the full range from 0° up to 100°, obtained by the conventional process of non-linear regression using the data from the restricted temperature range from about 22° up to about 40°.

The line 142 in FIG. 7 is then the prediction of the bias current, at temperatures across the full range from 0° up to 100°, obtained by the machine-learning process described above using matrix factorization, and using the data from the restricted temperature range from about 22° up to about 40°.

The line 146 is obtained by applying an optional non-linear regression fitting to the prediction represented by the line 142, in order to smooth out the curve.

It can be seen that, while the non-linear regression model 140 fits well close to the temperatures where data is available, it tends to deviate from the actual values at high temperature far away from the temperatures at which data are available. Meanwhile, the machine-learning prediction 142 is close to the actual raw data over the whose temperature range.

This is because the non-linear regression uses only information about the module whose properties are to be predicted, while the machine-learning-based model exploits knowledge from the whole training set (of about 500 modules).

Figure 8:
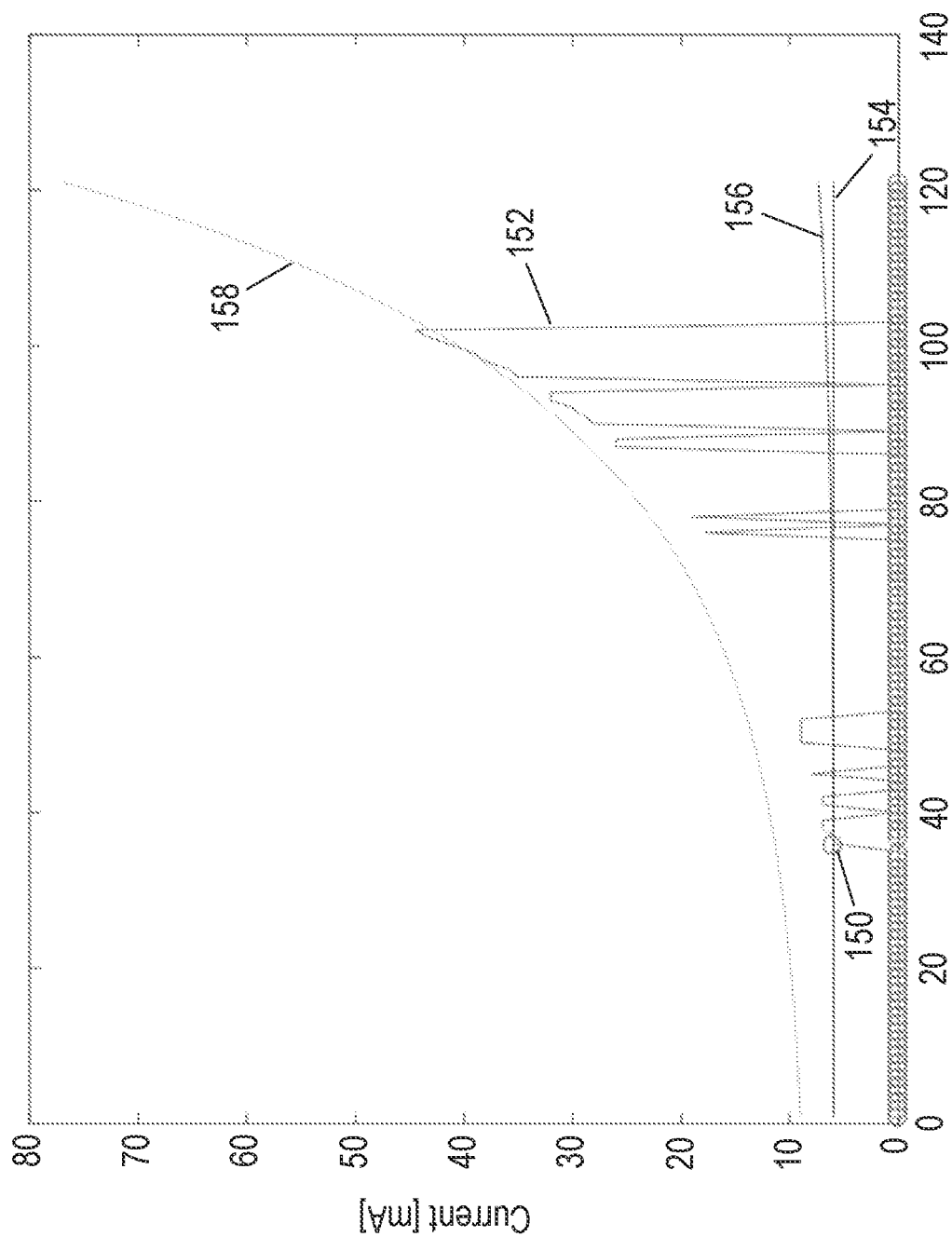
FIG. 8 illustrates a further stage in the method of FIG. 4.

FIG. 8 illustrates the use of the K-Nearest-Neighbors (KNN) technique, as described above, in the situation where only very limited data are available, that is, in the case of a "cold start".

Specifically, FIG. 8 shows a situation where only a single data point 150 is initially available. The actual full data of all available modules are the segments 152. (It will be noted that this data is very incomplete because a very small training set has been used in this example, and implementation with a larger training set will give better results.)

The line 154 shows the result of the non-linear regression, and the line 156 shows the result of the matrix factorization, and they both fail in this situation because they have only one point to fit. line 158 shows the result of the KNN process, which, in this extreme case, provides a far better prediction at higher temperatures.

Figure 9:
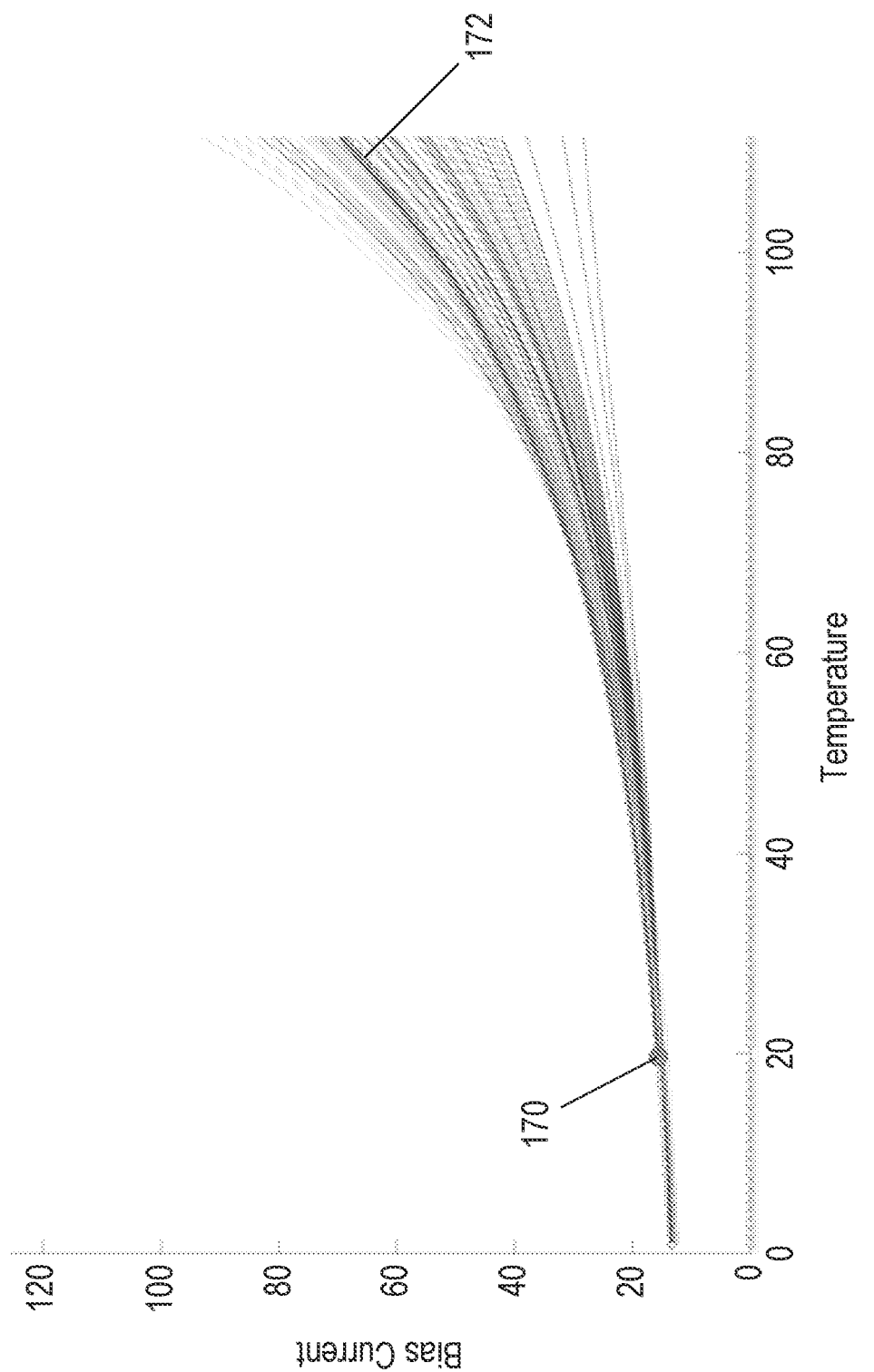
FIG. 9 illustrates operation of the method of FIG. 4.

FIG. 9 shows the result of including in the third matrix information relating to at least one explicit feature indicating a category of each of said plurality of second devices. Specifically, in the shown example, this approach is tested with a data set of about 5000 optical modules which belong to 6 different part numbers (and suppliers). So we add 6 rows in the V matrix and 6 columns in the U matrix. The first 2 rows of V are implicit features to be determined by the collaborative filtering.

Figure 12:
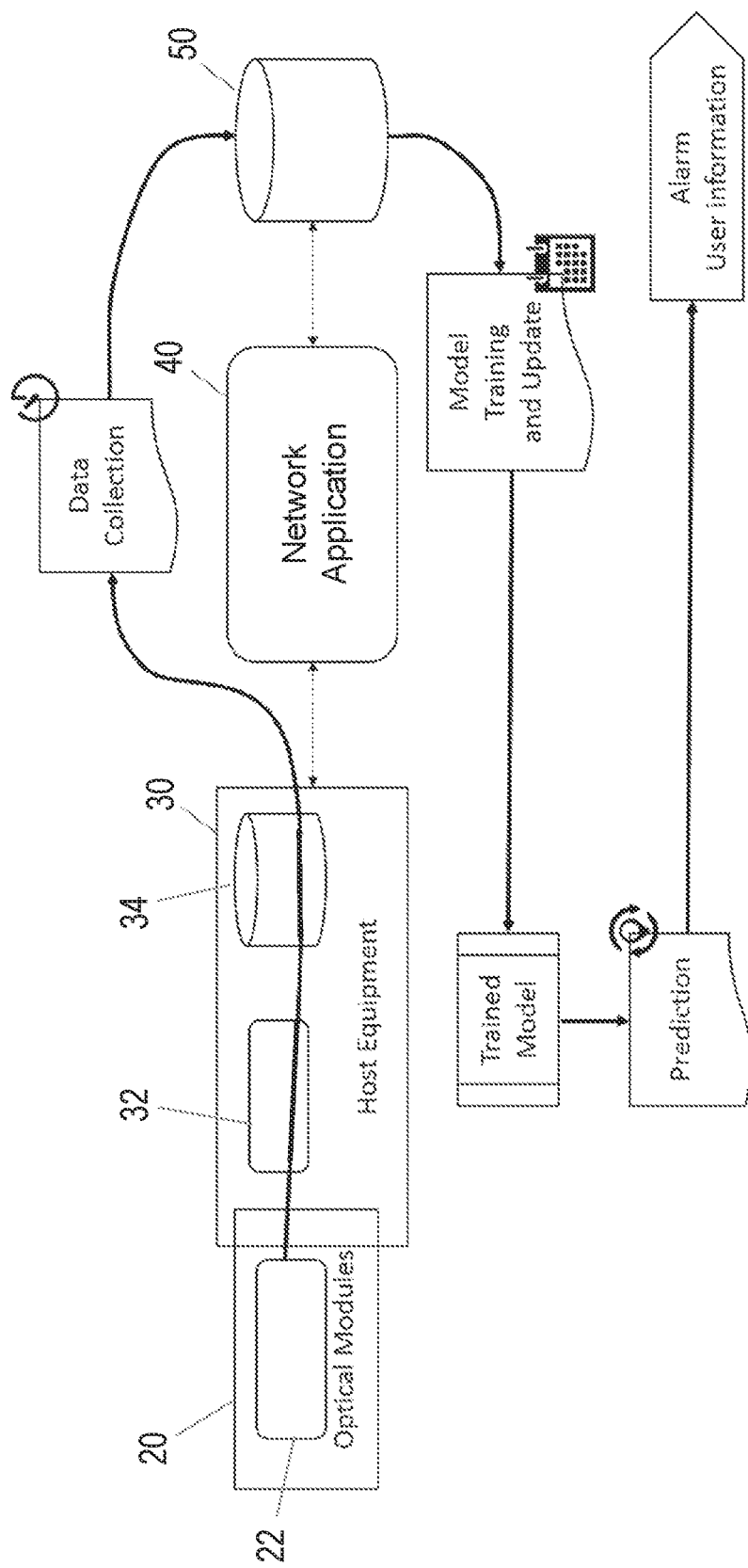
FIG. 12 illustrates a second application of the method of FIG. 4 in the network of FIG. 1.

FIG. 12 shows the predicted I-T (i.e. bias current against temperature) curves over 50 independent training attempts based on partial data for one particular optical module. Specifically, the circle 170 shows the only available measured data point used in obtaining the prediction. The line 172 shows the actual measured characteristic for that optical module, which was not used as part of the training set) and the blue circle is the only data used in the collaborative filtering to show the cold start performance where only one sample of the module bias current is available.

The other lines show the predicted bias current against temperature curves obtained using collaborative filtering. Performing collaborative filtering including in the third matrix information relating to the part number of the module gives a prediction that is on average considerably closer to the actual curve 172 than the collaborative filtering that does not include the information relating to the part number of the module, especially far from the temperature(s) at which measured data is available.

This can be further improved by adding other features, such as the production lot or release of the optical module, or any other DDMI information that helps to capture the differences between the optical modules.

Figure 10:
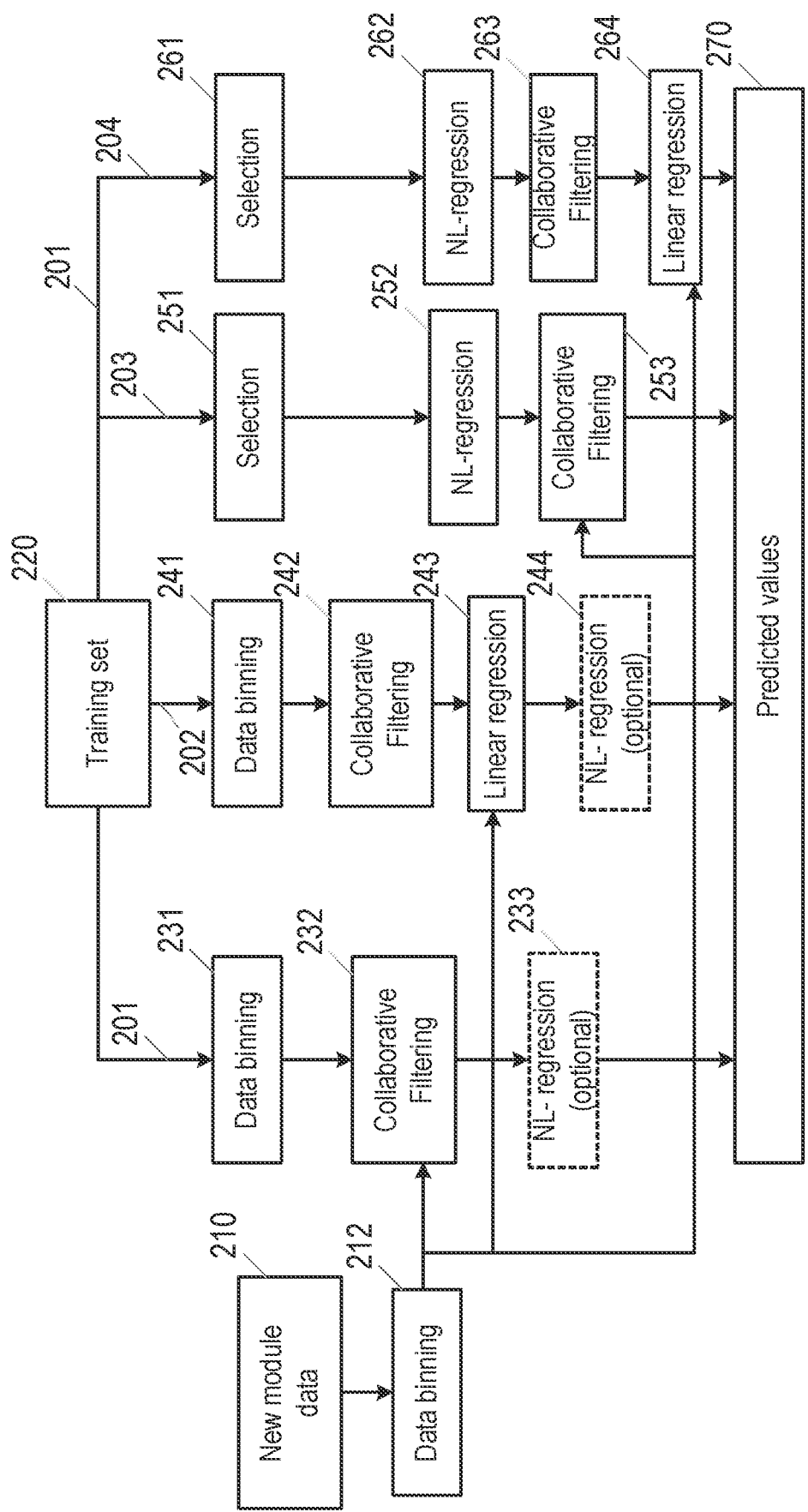
FIG. 10 is a flow chart, illustrating multiple alternative methods in accordance with an aspect of the disclosure.

FIG. 10 is a flowchart, illustrating different possible alternative methods, which are described in more detail above.

Specifically, FIG. 10 shows a first method 201, a second method 202, a third method 203, and a fourth method 204. In each case, the method uses partial data 210, relating to the properties of a specific first device, whose properties it is desired to predict. For example, the partial data 210 may comprise respective values of a first parameter at specific values of a second parameter within a predetermined range that is just a part of an overall total temperature range. In the specific example described here, where the first device is an optical module, the partial data 210 may comprise respective values of a bias current at specific values of a temperature within a predetermined temperature range.

As described above, at step 212 the data 210 is binned. That is, the total temperature range is divided into intervals, the available data values are allocated to those intervals, and then a single representative value of the bias current is chosen for each of the temperature intervals, for example by choosing the mean or the median of the available data values allocated to the respective interval.

The methods use a training set 220, which comprises the data relating to the properties of a plurality of second devices, which have characteristics in common with the first device. For example, where the first device is a specific optical module made by a particular manufacturer and sold under a specific part number, the second devices may be other optical modules sold by the same manufacturer under the same part number, or may be other optical modules sold by the same manufacturer regardless of the part number, or may be other optical modules sold by any manufacturer that are intended to be equivalent in some way to the first device, or may be any other optical modules.

The training set 220 may comprise, for each of the second devices, respective values of the first parameter at specific values of the second parameter, i.e. respective values of the bias current at specific values of the temperature in the case of optical modules.

In the first method 201, the data of the training set 220 is first binned, as described above, at step 231, and then at step 232 the collaborative filtering process is applied as described above, using the memory-based approach. That is, the binned training set data, and the data 210 about the new module, are organized into a first matrix, which is then factorized into a second matrix and a third matrix.

The second matrix represents a relationship between the second parameter (i.e. the temperature) and a predetermined number of hidden features, and the third matrix represents a relationship between the plurality of second devices and said predetermined number of hidden features. The second matrix can be used to predict at least one value of the first parameter (i.e. the bias current) at at least one respective specific value of the second parameter, which may be outside the range of values for which the data 210 are available.

The resulting predictions across multiple values of the second parameter can then optionally undergo a non-linear regression at step 233 (for example assuming an exponential model for the bias current—temperature characteristic) for data smoothing.

In the second method 202, the data of the training set 220 is first binned, as described above, at step 241, and then at step 242 the collaborative filtering process is applied as described above, to derive a model-based feature matrix. That is, the binned training set data, but not the data 210 about the new module, are organized into a first matrix, which is then factorized into a second matrix and a third matrix.

The second matrix represents a relationship between the second parameter (i.e. the temperature) and a predetermined number of hidden features, and the third matrix represents a relationship between the plurality of second devices and said predetermined number of hidden features. The second matrix can be used to predict at least one value of the first parameter (i.e. the bias current) at at least one respective specific value of the second parameter, which may be outside the range of values for which the data 210 are available. Specifically, at step 243, a linear regression is used to make the prediction from the new module data 210.

Again, the resulting predictions across multiple values of the second parameter can then optionally undergo a non-linear regression at step 244 (for example assuming an exponential model for the bias current—temperature characteristic) for data smoothing.

In the third method 203, the data of the training set 220 is first filtered at step 251 to select only data from devices for which data is available over a wide range of values of the second parameter. Thus, in the case of optical modules, modules are selected for which there is bias current data over a wide temperature range, and so we have a quite complete representation of their current-temperature characteristic. At this point, at step 252, a non-linear regression is performed (for example using an exponential model) to provide respective curves for each of the selected modules covering the whole temperature range (for example from 0-120 degrees), with the non-linear regression curves being quantized at fixed temperature intervals.

At step 253, collaborative filtering is then applied using the memory-based approach. The use of KNN suits this method since the matrix Z is now complete having been built with a non-linear NL regression of raw data (contrary to binning which provided a sparse matrix)

As described with reference to step 232, the collaborative filtering process using the memory-based approach provides a prediction of at least one value of the first parameter (i.e. the bias current) at at least one respective specific value of the second parameter, which may be outside the range of values for which the data 210 are available.

In the fourth method 204, the data of the training set 220 is again filtered at step 261 to select only data from devices for which data is available over a wide range of values of the second parameter. Thus, in the case of optical modules, modules are selected for which there is bias current data over a wide temperature range, and so we have a quite complete representation of their current-temperature characteristic. At this point, at step 262, a non-linear regression is performed (for example using an exponential model) to provide respective curves for each of the selected modules covering the whole temperature range (for example from 0-120 degrees), with the non-linear regression curves being quantized at fixed temperature intervals.

At step 263, collaborative filtering is then applied using the model-based approach. In this case, the matrix factorization step of the collaborative filtering can be done directly with the linear algebra technique Singular Vector Decomposition (SVD), since the Z matrix is complete, and this leads to faster computation.

At step 264, a linear regression is used to make the prediction from the new module data 210.

Thus, all four methods 201, 202, 203, 204 lead to at least one predicted value 270 for the first parameter (i.e. the bias current) at at least one respective specific value of the second parameter, which may be outside the range of values for which the data 210 are available.

In the model-based approaches of the second method 202 and the fourth method 204, the binned data 212 relating to the new module feed the linear regression 243, 264 after collaborative filtering 242, 263, while in the memory-based approaches of the first method 201 and the third method 203, the binned data 212 relating to the new module are used directly in the collaborative filtering training 232, 253.

In all of these methods, the collaborative filtering model may be periodically updated to take account of new data becoming available.

The method described above can be deployed in many different scenarios, and several of these will now be described. In the example of optical modules forming part of a host equipment that is connected to a network application as shown in FIG. 1 or in FIG. 3, FIGS. 11-14 illustrate four deployment scenarios by way of example.

Figure 11:
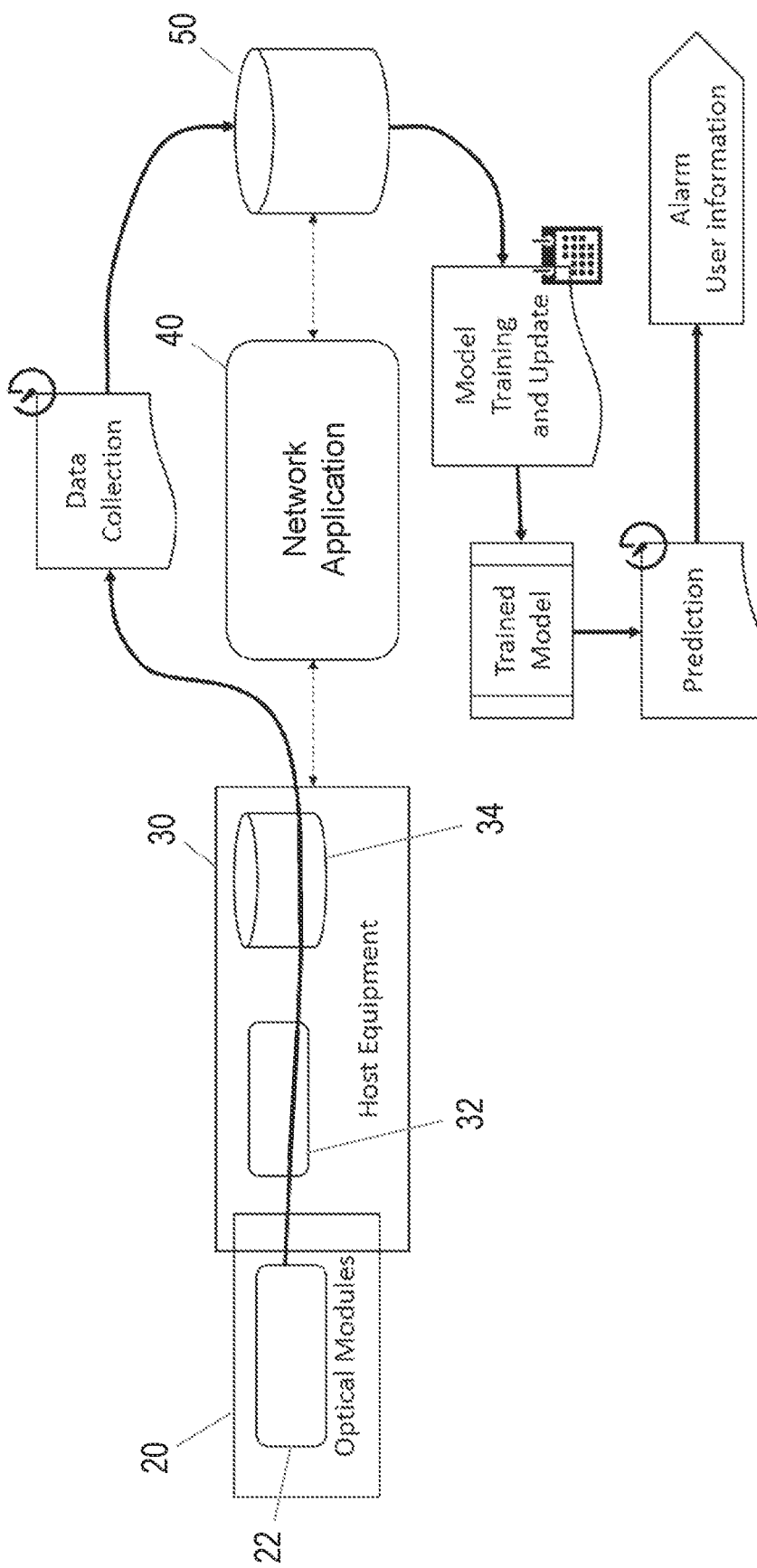
FIG. 11 illustrates a first application of the method of FIG. 4 in the network of FIG. 1.

Specifically, FIG. 11 shows a full cloud application.

In this approach, all the operations relevant to the training and the prediction described above are performed in the cloud-based network application 40. Thus, data is collected in real time, the model is trained and updated on a timed scale (which may for example be on a scale of months), the trained model is used to make predictions on a timed scale when predicted values are required (which may for example be on a scale of hours or days), and the predictions are used to provide alarms to the user when required.

The size of the cloud storage 50 allows the raw sensor samples of the optical modules to be stored, allowing training to be performed on extensive datasets, and allowing implementation of prediction and training in a single step (as in the first and third methods 210, 203 described with reference to FIG. 10 above). This has the advantage of excellent generalization, at the cost of needing more resources.

Advantages of the full cloud application are that:

the availability of a huge dataset allows good generalization;

the system has flexibility, in that the algorithm, and/or the parameters, and/or the timing of operations can be changed from a single point; and there are no changes models in the host equipment, as new alarms or customer recommendations are carried out centrally, and there is no need to change the existing modelling of the hosts.

FIG. 12 shows a deployment with edge prediction, and cloud training, which can be applied to the second and fourth methods 202, 204 described above.

In this approach, training is performed in the cloud, and the prediction is performed on the edge, in the host equipment. Specifically, data is collected in real time, and the model is trained and updated on a timed scale (which may for example be on a scale of months), in the network application 40. The size of the cloud storage 50 allows storage of the raw sensor samples from the optical modules, allowing training to be performed on extensive datasets to train and update the model. The trained model is then supplied to the host equipment 30, and used to make predictions on a timed scale when predicted values are required (which may for example be on a scale of hours or days). The resources available for prediction in the host equipment do not allow transfer of the full dataset, limiting the alternatives to the second and fourth methods 202, 204 described above.

The predictions produced by the model are used to provide alarms to the user when required.

The advantages of using edge prediction, and cloud training are that:

availability of a huge dataset allows good generalization;

the possibility of real time predictions means that a new type of alarm can be defined in the host to report the risk of the optical module exceeding operating limits in extreme temperature conditions.

Figure 13:
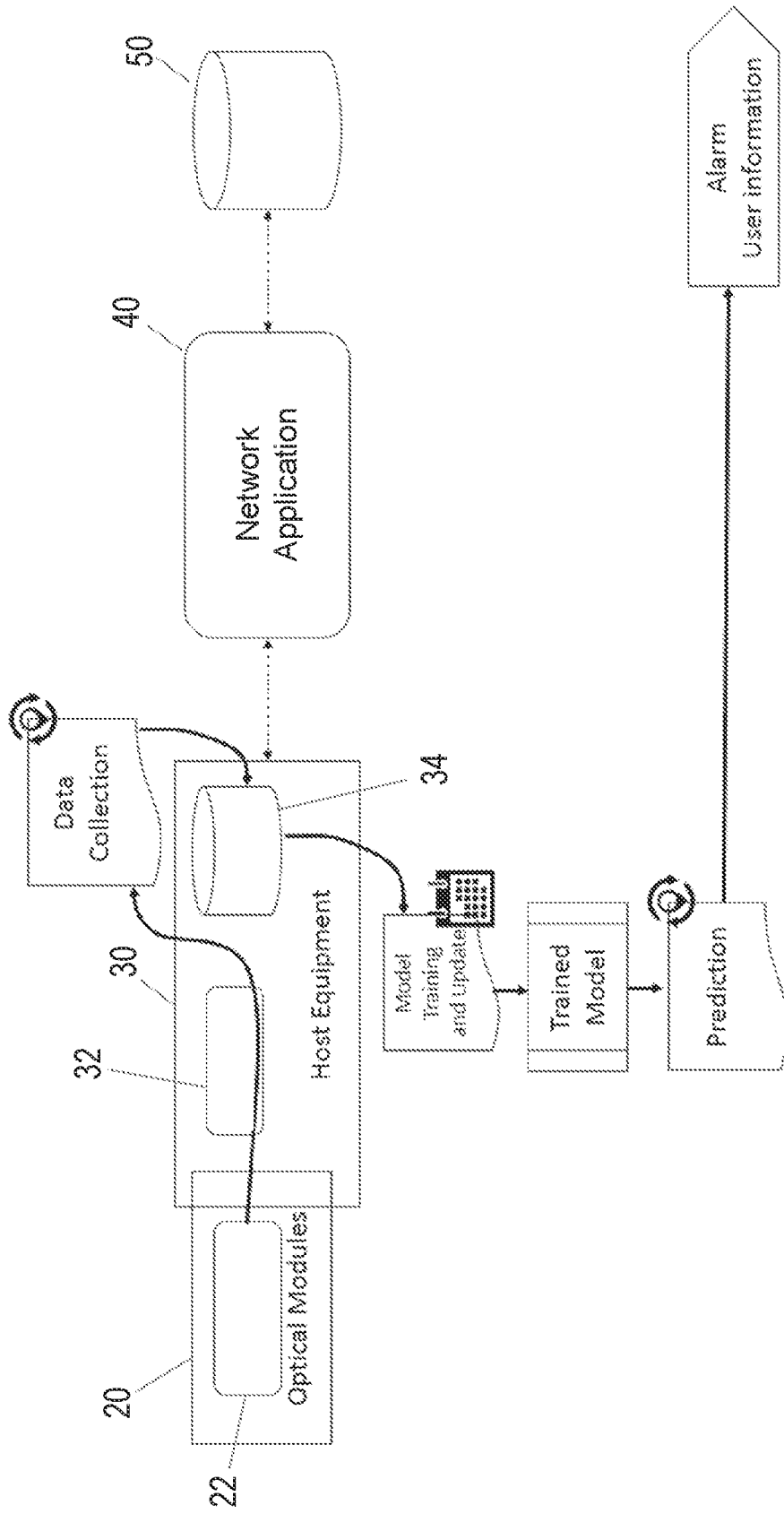
FIG. 13 illustrates a third application of the method of FIG. 4 in the network of FIG. 1.

FIG. 13 shows a deployment with full edge application, which again can be applied to the second and fourth methods 202, 204 described above.

In this approach every operation is performed on the edge. The host equipment 30 is deployed with a pre-trained model embedded in the embedded software, and the embedded storage allows the possibility to store historical data in the range of at least tens of optical modules for the full temperature range.

The storage is typically very constrained, and thus the data collection shall be paired with data compression techniques, such as a combination of temperature binning and current averaging for each module.

The advantages of the edge deployment are that:

the prediction of module performance can be performed even in the case of disconnection from the cloud application, thus ensuring reliability;

in the case when the host equipment 30 and the cloud application 40 are owned by different entities, it is not necessary for the owner of the host equipment 30 to share its optical module sensor data and prediction model and algorithm with the cloud application owner. The only information which must be shared is the alarm information.

Figure 14:
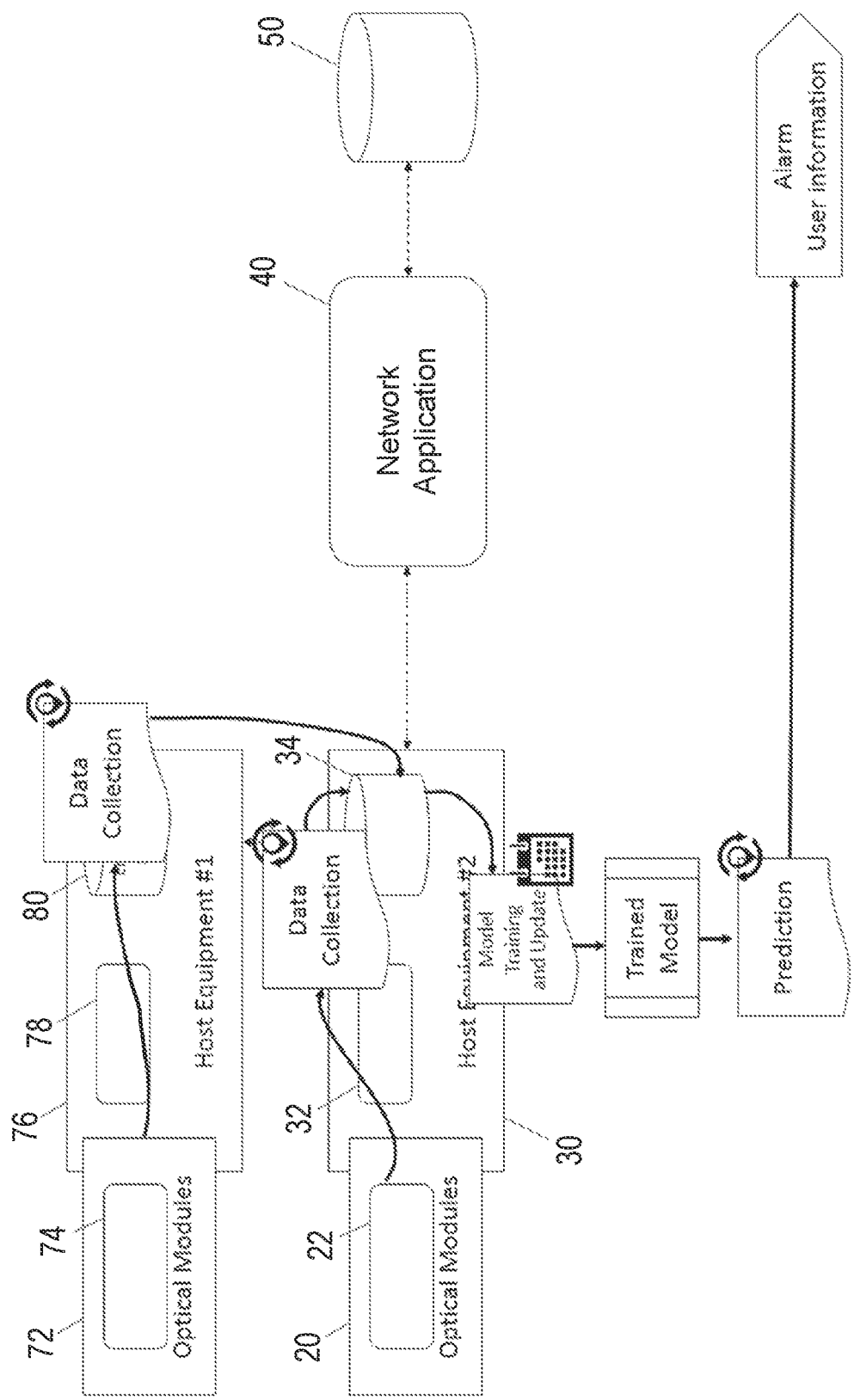
FIG. 14 illustrates a fourth application of the method of FIG. 4 in the network of FIG. 1.

FIG. 14 shows a deployment with full edge configuration in a hierarchical node. As shown in FIG. 14, the full edge configuration can be distributed across different hosts 30, 76 in the case of a hierarchical node configuration. This is especially applicable to radio networks where Baseband Units have more computing resources than Radio Units. In this way the limits of computing power in the radio units are not limiting the opportunity of collecting useful data, and the amount and variety of collected data grows thanks to the distribution across multiple units.

The full edge configuration in hierarchical node keeps the advantages of the edge computing, while reducing the constraints, (i.e. very small data variety and computing power limited by the local processor) given by a fully local data collection.

In each case, any alarm conditions relating to modules are reported in a dedicated service-panel with identification and localization information so that a replacement can be much better planned, and track-roll cost shared with other planned on-site activities.

There is thus disclosed a prediction method based on the use of collaborative filtering, which allows reliable prediction of the device behaviour at high temperatures by extracting the current-temperature relationships from a large number of devices.

Abbreviations

Abbreviation Explanation

BBU Base Band Unit
C-RAN Centralized Radio Access Network
DDMI Digital Diagnostic Monitoring Interface
EEPROM Electrically Erasable Programmable Read-Only Memory
NL Non Linear
RRU Remote Radio Unit
SVD Singular Vector Decomposition

The invention claimed is:

1. A method for predicting properties of a first device, the method comprising:

obtaining data relating to properties of a plurality of second devices, wherein the second devices have characteristics in common with the first device, wherein the data relating to the properties of the plurality of second devices comprise respective values of a first parameter at specific values of a second parameter;

organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;

factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

2. A method according to claim 1, wherein possible values of the second parameter lie on a continuum, and the specific values of the second parameter comprise intervals of a range of possible values of the second parameter.

3. A method according to claim 1, comprising obtaining said value of the first parameter at each of the specific values of the second parameter by forming a statistical summarization of a plurality of values of the first parameter associated with the specific values of the second parameter.

4. A method according to claim 3, comprising obtaining said value of the first parameter at each of the specific values of the second parameter as a mean of a plurality of values of the first parameter associated with the specific values of the second parameter.

5. A method according to claim 3, comprising obtaining said value of the first parameter at each of the specific values of the second parameter as a median of a plurality of values of the first parameter associated with the specific values of the second parameter.

6. A method according to claim 1, wherein organizing the obtained data in the first matrix comprises organizing the obtained data relating to the properties of a plurality of second devices, and the partial data relating to the properties of the first device, in the first matrix, the method further comprises using a non-linear regression to predict the at least one value of the first parameter at the at least one respective specific value of the second parameter outside said predetermined range.

7. A method according to claim 1, wherein using the second matrix and/or the third matrix to predict at least one value of the first parameter at the at least one respective specific value of the second parameter outside said predetermined range comprises applying a linear regression to the partial data relating to the properties of the first device, wherein the method further comprises, as additional data relating to the properties of the first device become available, using the second matrix to make a new prediction of at least one value of the first parameter at at least one respective specific value of the second parameter.

8. A method according to claim 1, wherein obtaining the data relating to the properties of a plurality of second devices, and organizing the obtained data in the first matrix, comprise:
obtaining initial data relating to the properties of a first plurality of second devices; and
selecting, from said initial data, data relating to the properties of a subset of the first plurality of second devices, wherein said subset of the first plurality of second devices contains second devices for which data relating to the respective values of the first parameter are available for a large part of a range of possible values of the second parameter, wherein
the method further comprising, as a preliminary step, when the partial data comprises respective values of the first parameter at specific values of the second parameter within a narrow range, using a K-Nearest-Neighbours technique to predict at least one value of the first parameter at at least one respective specific value of the second parameter outside said narrow range.

9. A method according to claim 1, further comprising:
including in said third matrix information relating to at least one explicit feature indicating a category of each of said plurality of second devices, wherein said information relating to at least one explicit feature indicating a category of each of said plurality of second devices comprises a part number.

10. A method according to claim 1, wherein the first device and the second devices comprise optical modules, and wherein the first parameter is a bias current of the optical module and the second parameter is a temperature.

11. A method according to claim 10, further comprising using the predicted value of the first parameter at at least one respective specific value of the second parameter to identify a potential failure risk of the optical module.

12. A method according to claim 11, comprising using the predicted value of the first parameter at at least one respective specific value of the second parameter to identify a potential failure risk of the optical module by comparing said predicted value of the first parameter with a specified operating range.

13. A system for predicting properties of a first device, the system comprising:
a memory for storing data relating to properties of a plurality of second devices, wherein the second devices have characteristics in common with the first device, wherein the data relating to the properties of the plurality of second devices comprise respective values of a first parameter at specific values of a second parameter;
at least one processor, wherein the at least one processor is configured for:
organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;
factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and
based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

14. A system according to claim 13, wherein the at least one processor comprises a first processor located with the first device and a second processor located remote from the first device, and wherein the second processor is configured for:
organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available; and
factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features; and wherein the first processor is configured for:

based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range wherein the first device and the second devices comprise optical modules.

15. A network application, for use in predicting properties of a first device, the network application comprising:

a memory for storing data relating to the properties of a plurality of second devices, wherein the second devices have characteristics in common with the first device, wherein the data relating to the properties of the plurality of second devices comprise respective values of a first parameter at specific values of a second parameter;

at least one processor, wherein the at least one processor is configured for:

organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available;

factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features.

16. A network application according to claim 15, wherein the at least one processor is further configured for:

based on partial data relating to the properties of the first device, wherein the partial data comprises respective values of the first parameter at specific values of the second parameter within a predetermined range, using the second matrix and/or the third matrix to predict at least one value of the first parameter at at least one respective specific value of the second parameter outside said predetermined range.

17. A network application according to claim 15, configured for sending a model based on the factorization of the first matrix to at least one remote device.

18. A host equipment for predicting properties of a first device, the host equipment comprising:

an input for receiving data relating to the properties of a plurality of second devices, wherein the second devices have characteristics in common with the first device, wherein the data relating to the properties of the plurality of second devices comprise respective values of a first parameter at specific values of a second parameter;

at least one processor, wherein the at least one processor is configured for:

based on partial data relating to the properties of the first device, wherein the partial data comprises respective values of the first parameter at specific values of the second parameter within a predetermined range, using a model to predict at least one value of the first parameter at at least one respective specific value of the second parameter outside said predetermined range.

19. A host equipment according to claim 18, configured for transmitting said received data to a central application, and for receiving said model from said central application.

20. A host equipment according to claim 18, further comprising:

a memory for storing said data relating to the properties of a plurality of second devices, wherein the second devices have characteristics in common with the first device, wherein the data relating to the properties of one device comprise respective values of a first parameter at specific values of a second parameter;

wherein the at least one processor is further configured for:

organizing the obtained data in a first matrix, wherein each row or column of the first matrix represents one specific value of the second parameter, and each column or row of the first matrix contains for a respective one of the second devices the value of the first parameter at each of the specific values of the second parameter for which data is available; and factorizing the first matrix into a second matrix and a third matrix, wherein the second matrix represents a relationship between the second parameter and a predetermined number of hidden features, and wherein the third matrix represents a relationship between the plurality of second devices and said predetermined number of hidden features, to form said model.

* * * * *